(12) United States Patent
Arno et al.

(10) Patent No.: US 9,071,127 B2
(45) Date of Patent: Jun. 30, 2015

(54) DIRECT CURRENT VOLTAGE CONVERSION CIRCUIT HAVING MULTIPLE OPERATIONAL CONFIGURATIONS

(75) Inventors: Patrik Arno, Sassenage (FR); Christophe Premont, Sassenage (FR)

(73) Assignee: ST-Ericsson SA, Plan-les-Ouates (CH)

( * ) Notice: Subject to any disclaimer, the term of this patent is extended or adjusted under 35 U.S.C. 154(b) by 322 days.

(21) Appl. No.: 13/643,845

(22) PCT Filed: Apr. 27, 2011

(86) PCT No.: PCT/EP2011/056687
§ 371 (c)(1),
(2), (4) Date: Oct. 26, 2012

(87) PCT Pub. No.: WO2011/135012
PCT Pub. Date: Nov. 3, 2011

(65) Prior Publication Data
US 2013/0038305 A1    Feb. 14, 2013

Related U.S. Application Data

(60) Provisional application No. 61/347,925, filed on May 25, 2010.

(30) Foreign Application Priority Data

Apr. 28, 2010    (FR) ...................................... 10 53281

(51) Int. Cl.
*H02M 7/00*     (2006.01)
*H02M 3/07*     (2006.01)
*H02M 3/158*    (2006.01)

(52) U.S. Cl.
CPC ................ *H02M 3/07* (2013.01); *H02M 3/158* (2013.01)

(58) Field of Classification Search
CPC ....... H02M 3/07; H02M 3/158; H02M 3/073; H02M 3/156
USPC ............... 363/59, 60; 307/109, 110; 327/536; 323/225, 271, 259, 344, 288, 320
See application file for complete search history.

(56) References Cited

U.S. PATENT DOCUMENTS

| | | | |
|---|---|---|---|
| 6,429,632 B1 * | 8/2002 | Forbes et al. | 323/282 |
| 6,617,832 B1 * | 9/2003 | Kobayashi | 323/266 |
| 8,791,748 B2 * | 7/2014 | Nishida | 327/536 |
| 2007/0139982 A1 * | 6/2007 | Ueno et al. | 363/59 |
| 2007/0211503 A1 | 9/2007 | Oyama et al. | |
| 2009/0039947 A1 * | 2/2009 | Williams | 327/536 |
| 2009/0102439 A1 | 4/2009 | Williams | |
| 2009/0167260 A1 * | 7/2009 | Pauritsch et al. | 323/233 |

FOREIGN PATENT DOCUMENTS

WO    2006051479 A2    5/2006

* cited by examiner

*Primary Examiner* — Adolf Berhane
*Assistant Examiner* — Alex Torres-Rivera
(74) *Attorney, Agent, or Firm* — Coats & Bennett, PLLc

(57) ABSTRACT

The invention proposes a direct current voltage conversion circuit which can operate as a step-up circuit, a step-down circuit, or operate as a step-up or step-down circuit depending on the modes of operation.

19 Claims, 8 Drawing Sheets

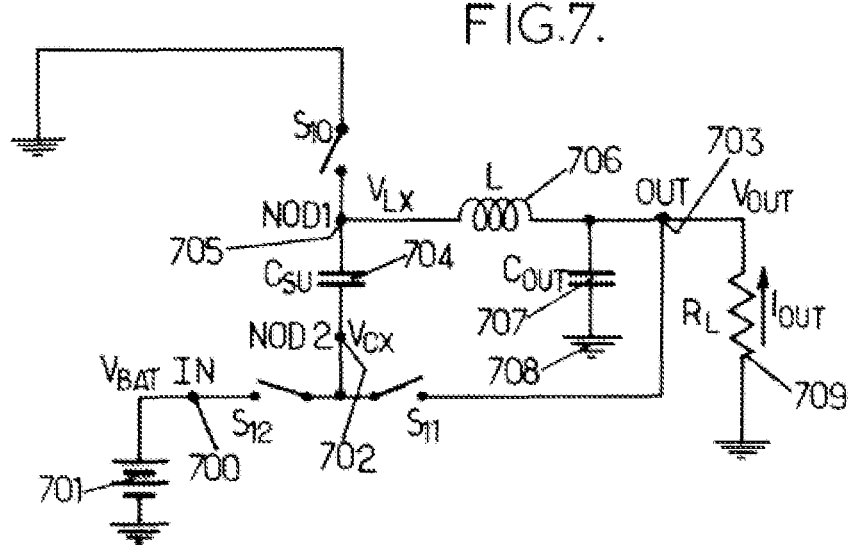
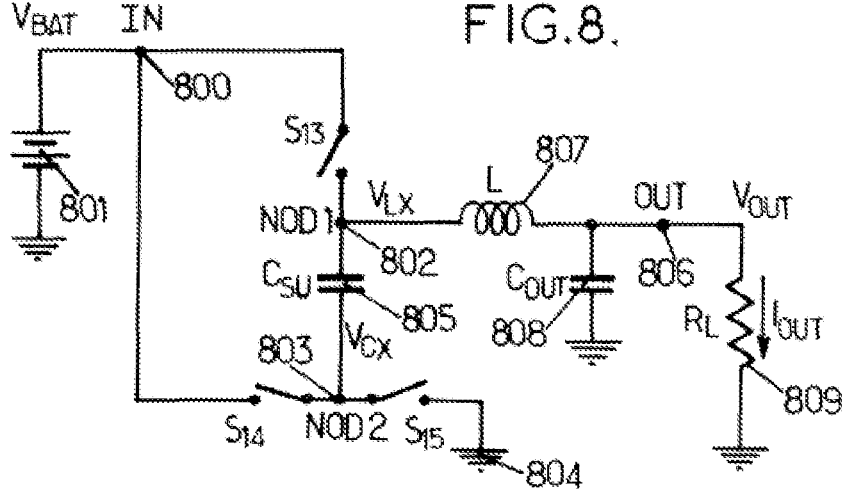
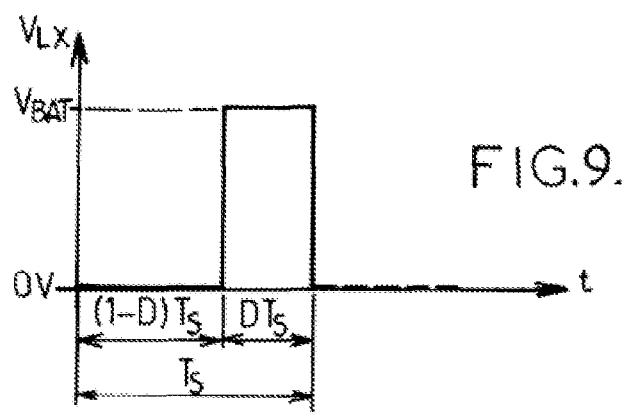

DIRECT CURRENT VOLTAGE CONVERSION CIRCUIT HAVING MULTIPLE OPERATIONAL CONFIGURATIONS

TECHNICAL FIELD

This invention relates to an electronic circuit for converting direct current (DC) voltages.

The invention relates in particular to conversion circuits used in portable electronic devices such as mobile telephones or music players, for converting voltage from a battery for use in other circuits of the device, for example to modulate the output voltage from the converter for envelope detection in a radio frequency power amplifier.

TECHNOLOGICAL BACKGROUND

The charge pump converter architecture is used in applications where a low cost and a reduced circuit area is desired. In the adjustment of the output voltage, this architecture greatly degrades the energy efficiency, and its use is therefore limited. In addition, this type of architecture is known to generate large ripple in the output voltage, due to the fact that the current provided to the output capacitor is not direct. As a result, this type of architecture generates a lot of noise in the signals generated or processed by the circuits it powers, which reduces its desirability in radio frequency applications.

The boost or buck-boost type of DC-DC conversion architecture is used in applications where an adjustable output voltage is desired. However, this architecture, in addition to also generating a lot of ripple in the output voltage and therefore a lot of noise, involves very high currents. In addition, due to the fact that the control transistors of the circuit operate in the ohmic region, and due to the presence of an inductor in the circuit with its associated parasitic resistance, losses are generated by the Joule effect, which reduces the efficiency of the conversion.

Having an output current which is not direct also means there is no continuous control over the output voltage. This generates problems in the reaction speed of the circuit in addition to the ripple problems, so the circuit then has a narrow frequency range.

A wide frequency range is useful for modulating the output voltage from the DC-DC converter or for responding to rapid variations in the circuit load.

SUMMARY OF THE INVENTION

Therefore there is a general need to improve DC voltage converters, particularly in order to solve the above problems.

The invention notably provides a response to this need.

It proposes a direct current (DC) voltage conversion circuit comprising:
  an input terminal for receiving a DC input voltage to be converted,
  an output terminal for delivering an output voltage resulting from the conversion of the input voltage,
  a low-pass filter module with one output connected to the output terminal and one input connected to a first node of the circuit, and
  a capacitor module connected between the first node and a second node of the circuit,
wherein,
  the first node is connected to a first switching module configured to apply or not apply potentials to the first node as a function of phases of operation of the circuit, and the second node is connected to a second switching module configured to apply or not apply potentials to the second node as a function of phases of operation of the circuit,
  and wherein the output voltage is a function of: the duty cycle between the durations of the circuit phases of operation, and of the output voltage.

The circuit can be used to obtain a DC or modulated output voltage.

This circuit can operate as a step-up circuit, a step-down circuit (positive or negative voltage), or can operate selectively as a step-up or step-down circuit.

The circuit offers better efficiency than prior art step-up or step-down circuits, notably due to the fact that the circuit imposes lower direct currents in the inductor of the low-pass filter module than the prior art. The circuit therefore generates smaller Joule effect losses in the parasitic resistance associated with the inductor than in the prior art.

Ripple is also reduced in the circuit compared to prior art circuits, because the output current is direct and is continuously provided to the load by the inductor. The circuit can therefore be used in applications requiring low noise levels (for example radio frequency applications or audio applications).

The circuit also permits rapid adjustment of the output voltage by acting on the duty cycle, which allows more flexible use of the circuit.

The circuit can be used in various applications, such as, for example, envelope detection for a radio frequency signal in a telecommunications circuit, or power transmission. The circuit can be controlled to follow a reference signal over a wide frequency range, with good precision as well as good energy efficiency.

In a first embodiment, the circuit alternates between two phases of operation, which are:
  a first phase of operation wherein the first switching module applies to the first node the potential of the input terminal, and the second switching module applies to the second node a reference potential of the circuit, and
  a second phase of operation wherein the first switching module does not apply potential to the first node, and the second switching module applies to the second node a potential proportional to the potential of the input terminal.

In this first embodiment, the circuit operates as a step-up circuit.

Example the first switching module comprises a first controlled switch connected between the first node and the input terminal, and
  the second switching module comprises a second controlled switch connected between the second node and the reference potential, and a third controlled switch connected between the second node and the input terminal,
  and the first and second switches are controlled to be in the on state while the third switch is controlled to be in the off state in the first phase, and the first and second switches are controlled to be in the off state while the third switch is controlled to be in the on state in the second phase.

In one variation of the first embodiment, the circuit alternates between two phases of operation,
  a third phase of operation wherein the first switching module applies to the first node the potential from the input terminal, and the second switching module applies to the second node a reference potential of the circuit, and a fourth phase of operation wherein the first switching module does not apply potential to the first node, and the second switching module applies to the second node the potential from the output terminal.

Example the first switching module comprises a fourth controlled switch connected between the first node and the input terminal, and the second switching module comprises a fifth controlled switch connected between the second node and the reference potential, and a sixth controlled switch connected between the second node and the output terminal, and the fourth and fifth switches are controlled to be in the on state while the sixth switch is controlled to be in the off state in the third phase, and the fourth and fifth switches are controlled to be in the off state while the sixth switch is controlled to be in the on state in the fourth phase.

In a second embodiment, the circuit alternates between two phases of operation, which are:

a fifth phase of operation wherein the first switching module applies to the first node a reference potential of the circuit, and the second switching module applies to the second node the potential from the input terminal, and a sixth phase of operation wherein the first switching module does not apply potential to the first node, and the second switching module applies to the second node the reference potential of the circuit.

In this second embodiment, the circuit operates as a negative step-down circuit (the output voltage is negative and has a lower in the module than the input voltage).

Example the first switching module comprises a seventh controlled switch connected between the first node and the reference potential, and the second switching module comprises an eighth controlled switch connected between the second node and the reference potential, and a ninth controlled switch connected between the second node and the input terminal, and the seventh and ninth switches are controlled to be in the on state while the eighth switch is controlled to be in the off state in the fifth phase, and the seventh and ninth switches are controlled to be in the off state while the eighth switch is controlled to be in the on state in the sixth phase.

In one variation of the second embodiment, the circuit alternates between two phases of operation, which are:

a seventh phase of operation wherein the first switching module applies to the first node a reference potential of the circuit, and the second switching module applies to the second node the potential of the input terminal, and an eighth phase of operation wherein the first switching module does not apply potential to the first node, and the second switching module applies to the second node the potential of the output terminal.

Example the first switching module comprises a tenth controlled switch connected between the first node and the reference potential, and the second switching module comprises an eleventh controlled switch connected between the second node and the output terminal, and a twelfth controlled switch connected between the second node and the input terminal, and the tenth and twelfth switches are controlled to be in the on state while the eleventh switch is controlled to be in the off state in the seventh phase, and the tenth and twelfth switches are controlled to be in the off state while the eleventh switch is controlled to be in the on state in the eighth phase.

In a third embodiment, the circuit selectively operates according to the two following modes of operation:

a first mode of operation wherein the circuit alternates between two phases of operation, which are:

a ninth phase of operation wherein the first switching module applies to the first node the potential of the input terminal, and the second switching module applies to the second node the potential of the input terminal, and a tenth phase of operation wherein the first switching module does not apply potential to the first node, and the second switching module applies to the second node a reference potential of the circuit, and a second mode of operation wherein the circuit operates according to the first embodiment.

In the first mode, the circuit operates as a step-down circuit (positive output voltage which is less than the input voltage), and in the second mode, the circuit operates as a step-up circuit.

Example the first switching module comprises a thirteenth controlled switch connected between the first node and the input terminal, and the second switching module comprises a fourteenth controlled switch connected between the second node and the input terminal, and a fifteenth controlled switch connected between the second node and the reference potential, and, in the first mode of operation, the thirteenth and the fourteenth switches are controlled to be in the on state while the fifteenth switch is controlled to be in the off state in the ninth phase, and the thirteenth and fourteenth switches are controlled to be in the off state while the fifteenth switch is controlled to be in the on state in the tenth phase, and in the second mode of operation, the thirteenth and fifteenth switches are controlled to be in the on state while the fourteenth switch is controlled to be in the off state in the first phase, and the thirteenth and fifteenth switches are controlled to be in the off state while the fourteenth switch is controlled to be in the on state in the second phase.

In one variation of the third embodiment, the circuit alternates between four phases of operation, which are:

an eleventh phase of operation wherein the first switching module applies to the first node the potential of the input terminal, and the second switching module applies to the second node a reference potential of the circuit, a twelfth phase of operation wherein the first switching module does not apply potential to the first node, and the second switching module applies to the second node a potential proportional to the potential of the input terminal, a thirteenth phase of operation wherein the first switching module applies to the first node the potential of the input terminal, and the second switching module does not apply potential to the second node, and a fourteenth phase of operation wherein the first switching module applies to the first node the reference potential of the circuit, and the second switching module does not apply potential to the second node.

The circuit operates in a hybrid mode between a step-up function and a step-down function, which can be controlled via the duty cycles between the eleventh and twelfth phases on the one hand, and between the thirteenth and fourteenth phases on the other hand.

Example the first switching module comprises a sixteenth controlled switch connected between the first node and the input terminal, and a seventeenth controlled switch connected between the first node and the reference potential of the circuit, and the second switching module comprises an eighteenth controlled switch connected between the second node and the input terminal, and a nineteenth controlled switch connected between the second node and the reference potential, and, in the eleventh phase, the seventeenth and eighteenth switches are controlled to be in the off state while the sixteenth and nineteenth switches are controlled to be in the on state, in the twelfth phase, the sixteenth, seventeenth, and nineteenth switches are controlled to be in the off state while the eighteenth switch is controlled to be in the on state, in the thirteenth phase, the seventeenth, eighteenth, and nineteenth switches are controlled to be in the off state while the sixteenth switch is controlled to be in the on state, and in the fourteenth phase, the sixteenth, eighteenth, and nineteenth switches are controlled to be in the off state while the seventeenth switch is controlled to be in the on state.

The invention also proposes a circuit which selectively operates according to at least two of the three following modes of operation:
- a third mode wherein the circuit operates according to the first embodiment,
- a fourth mode wherein the circuit operates according to the second embodiment, and
- a fifth mode wherein the circuit operates according to the variation of the third embodiment.

Example the first switching module comprises a twentieth controlled switch connected between the first node and the input terminal, and a twenty-first controlled switch connected between the first node and the reference potential of the circuit, and the second switching module comprises a twenty-second controlled switch connected between the second node and the input terminal, and a twenty-third controlled switch connected between the second node and the reference potential, and the circuit selectively operates according to one of the three following modes of operation:
- a sixth mode wherein the twentieth and twenty-third switches are controlled to be in the on state, while the twenty-first and twenty-second switches are controlled to be in the off state in a fifteenth phase, and wherein the twentieth, twenty-first, and twenty-third switches are controlled to be in the off state while the twenty-second switch is controlled to be in the on state in a sixteenth phase, with the circuit alternating between the two phases,
- a seventh mode wherein the twenty-first, twenty-second, and twenty-third switches are controlled to be in the off state while the twentieth switch is controlled to be in the on state in a seventeenth phase, and wherein the twentieth, twenty-second, and twenty-third switches are controlled to be in the off state while the twenty-first switch is controlled to be in the on state in an eighteenth phase, with the circuit alternating between the two phases, and
- an eighth mode, wherein the circuit alternates between the fifteenth, sixteenth, seventeenth, and eighteenth phases of operation.

BRIEF DESCRIPTION OF DRAWINGS

Other features and advantages of the invention will become apparent from the following description. This description is for illustrative purposes only and is to be read with reference to the attached drawings, in which:

FIG. 7 illustrates a variation of the step-down circuit;

FIG. 8 illustrates a non-inverting step-up and/or step-down circuit according to one embodiment;

FIG. 9 illustrates the evolution of the input voltage of the low-pass filter module in the embodiment in FIG. 8;

Detailed Description of Embodiments of the Invention

Figure 1:
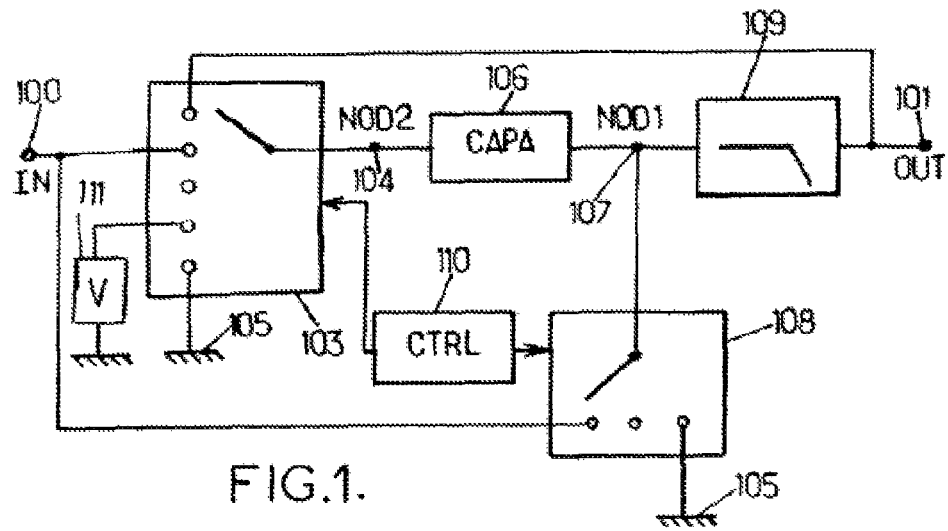
FIG. 1 illustrates a circuit architecture according to one embodiment.

A circuit architecture according to one embodiment is now described with reference to FIG. 1.

The circuit according to this embodiment comprises an input terminal 100 for receiving a DC input voltage to be converted. For example, the terminal 100 is connected to a battery supplying a voltage to be converted.

The circuit also comprises an output terminal 101 providing a DC output voltage substantially proportional to the input voltage.

The input terminal is connected to a switching module 103. This switching module allows selectively applying different potentials to a node 104 of the circuit, as a function of the phases of operation of said circuit. For example, the switching module 103 can apply a reference potential (for example the potential of the ground 105 of the circuit), the potential of the input terminal, the potential of the output terminal, or a potential generated by a dedicated module 111. For example, said module 111 is a linear regulator which delivers a voltage proportional to and less than the input voltage. The switching module may also leave the potential of the node 104 unaffected, and not apply potential to it.

In addition to the switching module 103 connected between the input terminal and the node 104, the circuit comprises a capacitor module 106 connected between the node 104 and another node 107 of the circuit. This capacitor module stores and restores energy to the circuit according to the phases of operation. For example, this module comprises a capacitor connected between the nodes 104 and 107.

The node 107 is connected to a switching module 108 which allows selectively applying different potentials to the node 107 as a function of the phases of operation of the circuit. For example, the switching module 108 allows applying to the node 107 the reference potential of the circuit (for example the ground potential) or the potential of the input terminal. The switching module may also leave the potential of the node 107 unaffected, and not apply potential to it.

The circuit also comprises a low-pass filter module 109 connected between the node 107 and the output terminal, in particular for smoothing the output voltage.

To control the phases of operation of the circuit, a control module 100 connected to the switching modules sends signals for selecting the potentials to be applied to the nodes 104 and 107, according to the phases of operation. The control module can be created using circuits known to a person skilled in the art for generating control signals for switches, for example as a function of the phases defined in the following description.

Three embodiments and variations of these embodiments are described below. In a first embodiment the circuit operates as a step-up circuit, in a second embodiment the circuit operates as an inverting and step-down circuit, and in a third embodiment the circuit can operate selectively as a step-up or step-down circuit. To represent the architecture presented in FIG. 1, the nodes corresponding to nodes 104 and 107 will be called NOD1 and NOD2 in the various figures illustrating the different embodiments and their variations. The switches presented below can be recognized as being part of the first or second switching module by their connection to either NOD1 or NOD2. In addition, the input and output from each circuit will be respectively denoted as IN and OUT in the figures.

Two embodiments of the control circuit 110 are also described below.

Step-up Circuit

Figure 2:
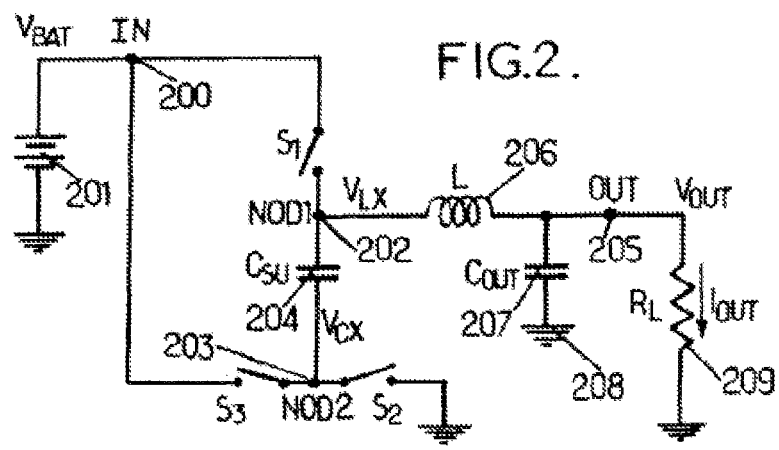
FIG. 2 illustrates a step-up circuit according to one embodiment.

We now describe a step-up circuit with reference to FIG. 2, using the general architecture described with reference to FIG. 1.

The circuit is connected by its input terminal 200 to a battery 201.

A controlled switch $S_1$ (for example a transistor) is connected between the input terminal and a node 202 of the circuit. Another controlled switch $S_3$ is connected between the input terminal and another node 203 of the circuit. A capacitor 204 of value $C_{su}$ is connected between nodes 202 and 203.

A switch $S_2$ is connected between the node 203 and the ground 208 of the circuit.

A low-pass filter composed of an inductor 206 of value L, and a capacitor 207 of value $C_{OUT}$, are arranged between the node 202 and the output terminal 205 of the circuit. The inductor is connected between the node 202 and the output terminal, and the capacitor 204 is connected between the output terminal and the ground 208 of the circuit.

The circuit is connected by its output terminal to a load resistor 209 of value $R_L$ which represents the equivalent load represented by the circuit supplied by the converter.

In this embodiment, the circuit alternates between two phases of operation.

In a first phase F1, the switches $S_1$ and $S_2$ are controlled to be in the on state, while the switch $S_3$ is controlled to be in the off state. Therefore the electrical energy stored in the battery is pulled and stored in both the inductor 206 and the capacitor 204. At the end of this first phase, the capacitor 204 is charged to the output voltage $V_{BAT}$ from the battery applied to the input terminal.

In a second phase F2, the switches $S_1$ and $S_2$ are controlled to be in the off state, while the switch $S_3$ is controlled to be in the on state. Thus the energy stored in the capacitor 204 is stored in the inductor 206.

Figure 3:
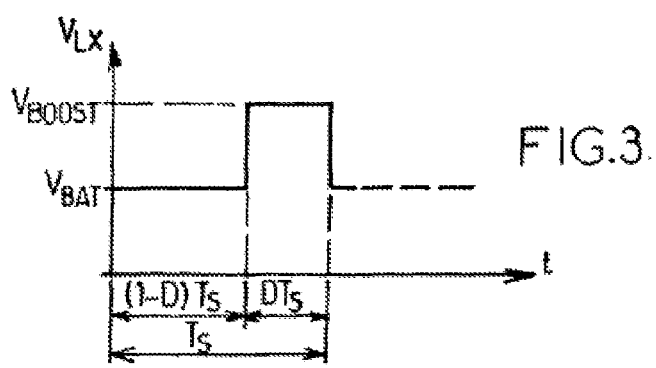
FIG. 3 illustrates the evolution of the input voltage of the low-pass filter module in the embodiment of FIG. 2.

FIG. 3 illustrates the evolution of the voltage $V_{LX}$ at the node 202 during phases F1 and F2. D ($0 \leq D \leq 1$) is the duty cycle between phases F1 and F2, and $T_S$ is the sum of the durations of the two phases. Thus phase F1 is of duration $(1-D)T_S$ and phase F2 is of duration $DT_S$.

During phase F1, the voltage $V_{LX}$ is equal to $V_{BAT}$, and during phase F2, the voltage $V_{LX}$ is equal to $V_{BOOST} = 2V_{BAT}$.

The output voltage $V_{OUT}$ corresponds to the average of the voltage $V_{LX}$ because this latter voltage is the input voltage of the filter, and the output voltage corresponds to the output from this filter.

We then have the output voltage equal to the average of the voltage $V_{LX}$ over the period $T_S$ of alternating phases (below, a horizontal line above an amount indicates the average of that amount over a period of alternating phases):

$$V_{OUT} = \overline{V_{LX}} = \frac{(1-D)T_S V_{BAT} + DT_S V_{BOOST}}{T_S},$$

and $$V_{OUT} = (1+D)V_{BAT}.$$

We therefore have the possibility of adjusting the output voltage by adjusting the value of the duty cycle.

Figure 14:
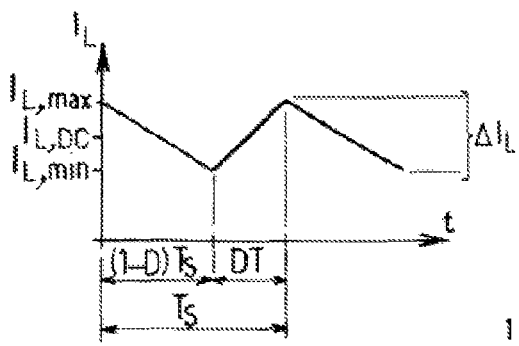
FIGS. 14 to 24 are graphs representing the evolution of several signals of circuits according to the embodiments in FIGS. 1 to 11.

Ripple in the inductor current (as illustrated in FIG. 14) is equal to:

$$\Delta I_L = D(1-D)\frac{T_S}{L}V_{BAT},$$

and the average current (see also FIG. 14) is substantially equal to the output current:

$$I_{L,DC} = I_{OUT}.$$

We therefore obtain a ripple and a current that are lower than in the prior art. For example, in a boost converter, the ripple and the average current are respectively:

$$\Delta I_L = D\frac{T_S}{L}V_{BAT}$$

and $$I_{L,DC} = \frac{I_{OUT}}{1-D}.$$

Figure 15:
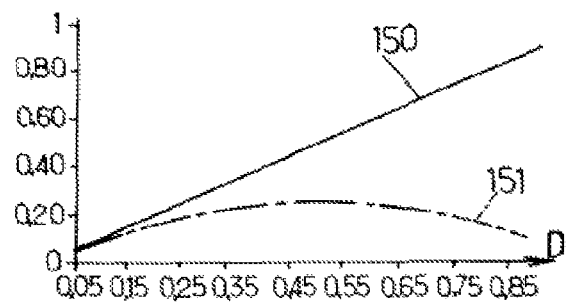

FIG. 15 represents the evolution of the normalized ripple $$\frac{\Delta I_L}{\frac{T_S V_{BAT}}{L}}$$

(no units) as a function of the duty cycle (no units), for a prior art boost circuit (curve 150), and for a circuit according to the present embodiment (curve 151). One can see in this figure that the normalized ripple remains limited in the present circuit, while in the prior art circuit the normalized ripple increases as the duty cycle increases. With the circuit of the invention, the duty cycle (and therefore the output voltage) can be varied with no risk of increasing the ripple and therefore the noise produced by such ripple.

Figure 16:
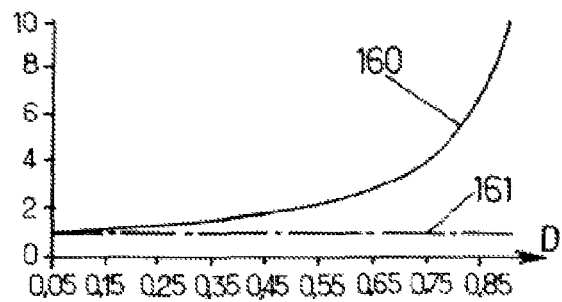

In addition, unlike in the prior art where the average current grows very quickly when the duty cycle approaches 1, in the present circuit the average current remains substantially equal to the output current. To illustrate this effect, FIG. 16 shows the evolution of the normalized current in the inductor compared to the output current $$\frac{I_{L,DC}}{I_{OUT}}$$

(no units) as a function of the duty cycle (no units), for a prior art boost circuit (curve 160) and for a circuit according to the present embodiment (curve 161). With the present circuit, the duty cycle can be varied over the entire range of 0 to 1 (to control the value of the output voltage) without inducing too high of a current in the inductor (which in the prior art causes Joule effect losses in the parasitic resistance of the inductor).

Figure 19:
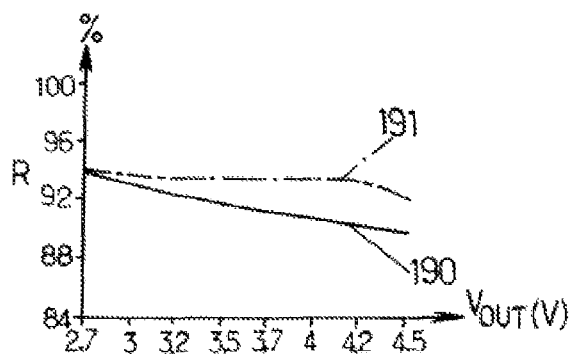
Figure 17:
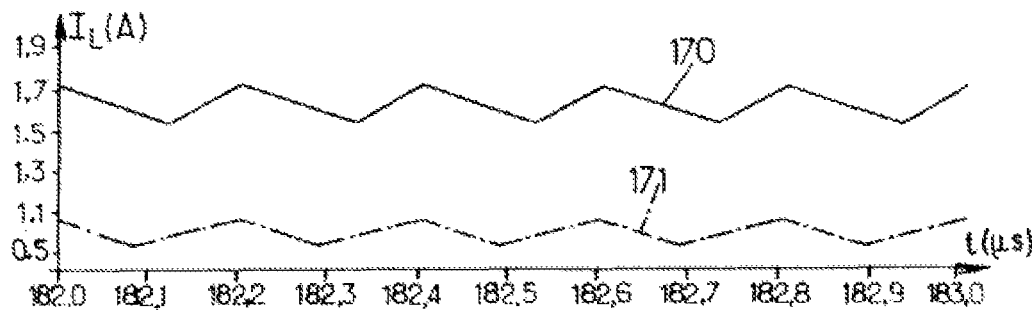
Figure 18:
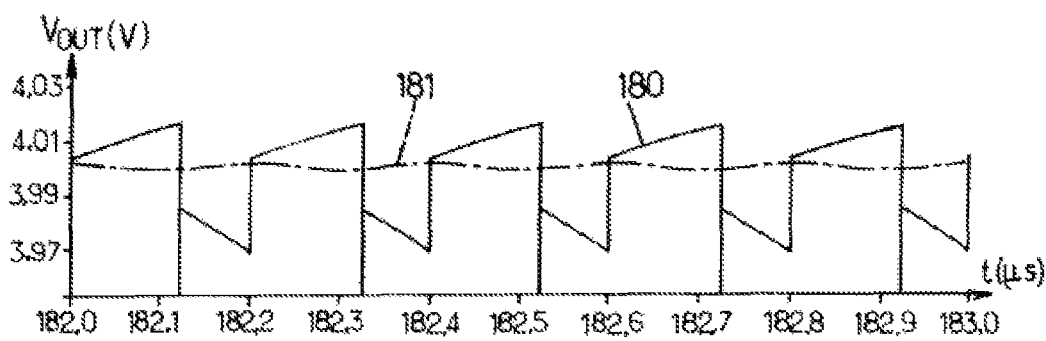

FIGS. 17 to 19 illustrate simulation results comparing the performances of a circuit according to the present embodiment and an equivalent prior art boost circuit. The following values were used:
$C_{OUT}$=4.7 μF,
$C_{SU}$=4.7 μF,
L=1 μH,
f=1/$T_S$=5 MHz, and
$V_{BAT}$=2.7 V.

FIG. 17 represents the evolution of the current in the inductor in a transient state, for a prior art boost circuit (curve 170) and for a circuit according to the present embodiment (curve 171). The y axis scale is in tenths of an ampere, and the x axis scale is in tenths of a microsecond. As one can see, the DC current in the inductor of the prior art circuit is 65% greater than the current in the inductor of the circuit according to the present embodiment (for the same output voltage and battery). The circuit of the present embodiment therefore induces less Joule effect loss than the prior art circuit.

FIG. 18 represents the evolution of the output voltage in a transient state, for a prior art boost circuit (curve 180) and for a circuit according to the present embodiment (curve 181). The y axis scale is in hundredths of a volt, and the x axis scale is in tenths of a microsecond. As one can see, the output voltage from the prior art circuit is greatly impacted and has a large amplitude, while the output voltage from the circuit according to the present embodiment is substantially constant. The voltage provided by the circuit of the embodiment therefore has little noise.

FIG. 19 represents the evolution of the energy efficiency (as a %), as a function of the output voltage (in volts), for a prior art boost circuit (curve 190) and for a circuit of the present embodiment (curve 191), for an output current of 0.6 amps. As one can see, the efficiency of the prior art circuit rapidly falls as the output voltage increases, while the efficiency of the circuit of the present embodiment is substantially constant. In addition, the efficiency of the circuit of the present embodiment remains greater than the efficiency of the prior art circuit.

In one configuration (not represented) of this embodiment, instead of having the controlled switch $S_3$ connected between the node 203 and the input terminal 200, the controlled switch $S_3$ is connected between the node 203 and a linear voltage regulator which delivers a voltage $V_R$ less than and proportional to the input voltage. In this configuration, the voltage $V_{BOOST}$ is equal to $V_{BAT}+V_R$. The general operation of the circuit remains the same.

Variation

Figure 4:
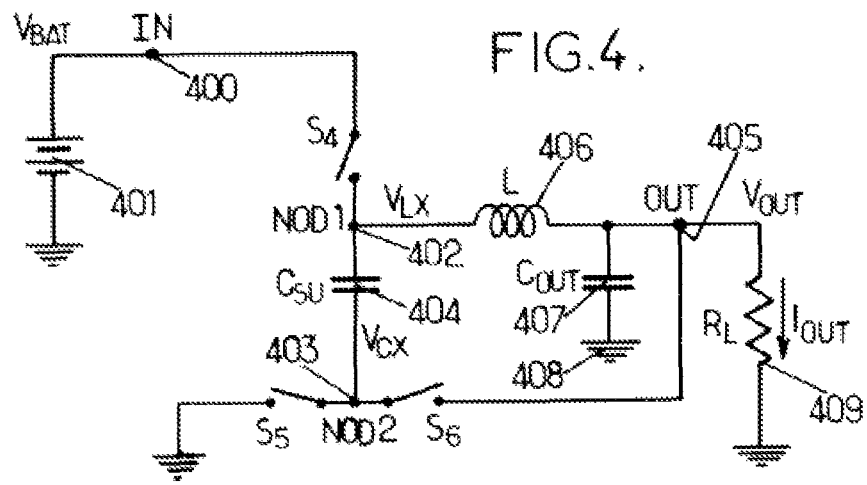
FIG. 4 illustrates one variation of the step-up circuit.

A variation of the previously described step-up circuit will now be described with reference to FIG. 4.

In this circuit, a battery 401 charges the input terminal 400 which is connected to a controlled switch $S_4$ (for example a transistor) which connects the input terminal to a node 402 of the circuit. The node 402 is coupled to the output terminal 405 of the circuit by a low-pass filter composed of an inductor 406 of value L connected between the node 402 and the output terminal, and of a capacitor 407 of value $C_{OUT}$ connected between the output terminal and a reference potential of the circuit 408 (for example the ground of the circuit). A capacitor 404 of value $C_{SU}$ is connected between the node 402 and another node 403 of the circuit. A controlled switch $S_5$ connects the node 403 to the reference potential (the ground), and a controlled switch $S_6$ connects the node 403 to the output terminal.

In this embodiment, the circuit alternates between two phases of operation.

In a first phase F3, the switches $S_4$ and $S_5$ are controlled to be in the on state, while the switch $S_6$ is controlled to be in the off state. In a second phase F4, the switches $S_4$ and $S_5$ are controlled to be in the off state while the switch $S_6$ is controlled to be in the on state.

The evolution of the voltage $V_{LX}$ at the node 402 is substantially identical to that of the graph in FIG. 3. D (0≤D≤1) is the duty cycle between the phases F3 and F4, and $T_S$ is the sum of the durations of the two phases. Thus, phase F3 is of duration (1−D)$T_S$ and phase F4 is of duration D$T_S$.

During phase F3, the voltage $V_{LX}$ is equal to $V_{BAT}$, and during phase F4, the voltage $V_{LX}$ is equal to $V_{BOOST}=V_{OUT}+V_{BAT}$.

We then have the output voltage equal to the average over $T_S$ of the voltage $V_{LX}$:

$$V_{OUT} = \overline{V_{LX}} = \frac{(1-D)T_S V_{BAT} + DT_S V_{BOOST}}{T_S},$$

and $$V_{OUT} = \frac{V_{BAT}}{(1-D)}.$$

Inverting and Step-down Circuit

Figure 5:
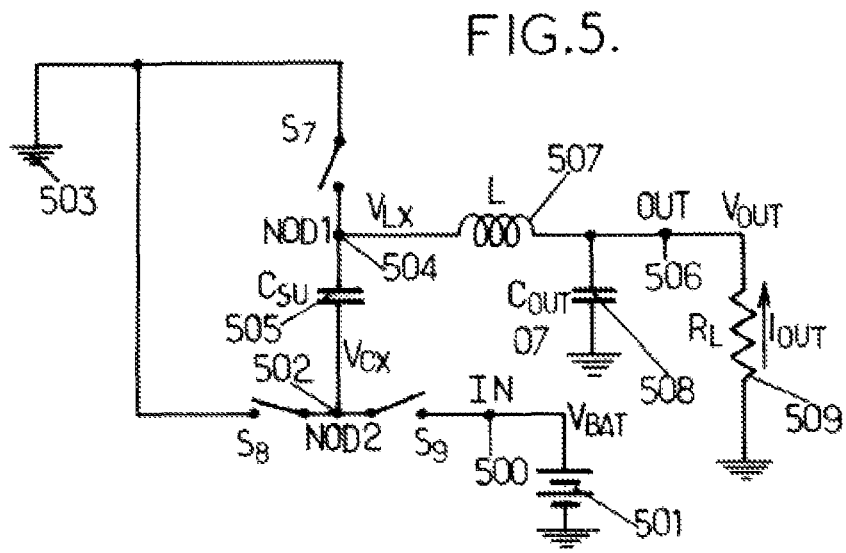
FIG. 5 shows an inverting step-down circuit according to one embodiment.

A step-down circuit will now be described with reference to FIG. 5, using the general architecture described with reference to FIG. 1.

The circuit is connected by its input terminal 500 to a battery 501.

A controlled switch $S_9$ (for example a transistor) is connected between the input terminal and a node 502 of the circuit. Another controlled switch $S_8$ is connected between the node 502 and a reference potential of the circuit (for example the ground 503 of the circuit). A switch $S_7$ is connected between the ground 503 of the circuit and a node 504 of the circuit. A capacitor 505 of value $C_{su}$ is connected between the nodes 502 and 504.

A low-pass filter composed of an inductor 507 of value L and a capacitor 508 of value $C_{OUT}$ is arranged between the node 504 and the output terminal 506 of the circuit. The inductor is connected between the node 504 and the output terminal, and the capacitor 508 is connected between the output terminal and the ground of the circuit.

The circuit is connected by its output terminal to a load resistor 509 of value $R_L$ which represents the equivalent load represented by the circuit supplied by the converter.

In this embodiment, the circuit alternates between two phases of operation.

In a first phase F5, the switches S7 and S9 are controlled to be in the on state, while the switch S8 is controlled to be in the off state. Thus the electrical energy provided by the battery and the energy provided by the load are pulled and stored in both the inductor 507 and the capacitor 505. At the end of this first phase, the capacitor 505 is charged to $-V_{BAT}$ meaning the opposite of the battery voltage applied to the input terminal.

In a second phase F6, the switches $S_7$ and $S_9$ are controlled to be in the off state, while the switch $S_8$ is controlled to be in the on state. Thus the energy of the pulled charge is injected to the ground through the inductor 507 and the capacitor 505. At the end of this phase, the voltage $V_{LX}$ at the node 504 is $-V_{BAT}$.

Figure 6:
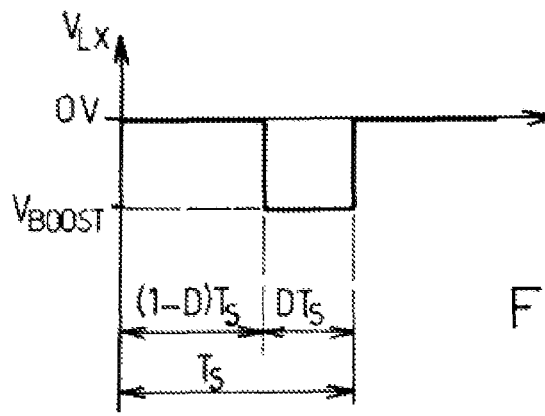
FIG. 6 illustrates the evolution of the input voltage of the low-pass filter module in the embodiment in FIG. 5.

FIG. 6 illustrates the evolution of the voltage $V_{LX}$ at the node 504 during phases F5 and F6. D ($0 \leq D \leq 1$) is the duty cycle between phases F5 and F6, and $T_S$ is the sum of the durations of the two phases. Thus phase F5 is of duration $(1-D)T_S$ and phase F6 is of duration $DT_S$.

During phase F5 the voltage $V_{LX}$ is zero (meaning the zero potential of the ground), and during phase F6 the voltage $V_{LX}$ is equal to $V_{BOOST} = -V_{BAT}$.

The output voltage is then equal to the average over the period $T_S$ of the voltage $V_{LX}$:

$$V_{OUT} = \overline{V_{LX}} = \frac{(1-D)T \times 0 + DT_S V_{BOOST}}{T_S},$$

and $$V_{OUT} = -DV_{BAT}.$$

We therefore have the possibility of adjusting the output voltage by adjusting the value of the duty cycle.

The ripple in the inductor current (see FIG. 14) is equal to:

$$\Delta I_L = D(1-D)\frac{T_S}{L}V_{BAT},$$

and the absolute value of the average current (see FIG. 14) is substantially equal to the output current:

$$|I_{L,DC}| = I_{OUT}.$$

This obtains a ripple and a current that are lower than in the prior art. For example, in a buck/boost converter, the ripple and the absolute value of the average current respectively equal:

$$\Delta I_L = D\frac{T_S}{L}V_{BAT}$$

and $$|I_{L,DC}| = \frac{I_{OUT}}{1-D}.$$

The ripple and the current, normalized, evolve as illustrated in FIGS. 15 and 16.

Figure 20:
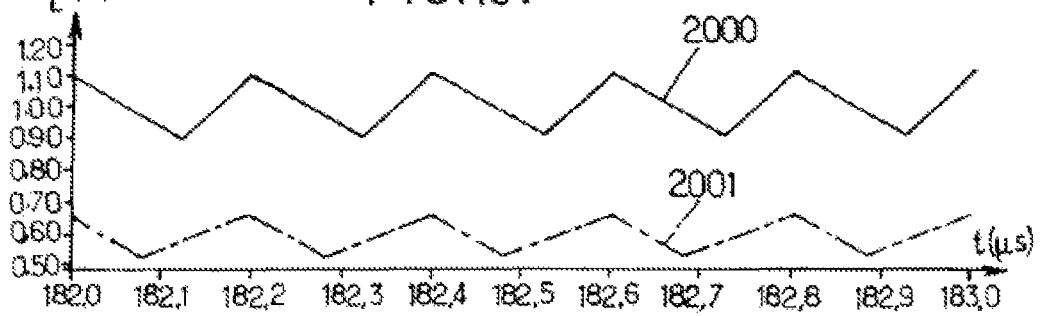
Figure 21:
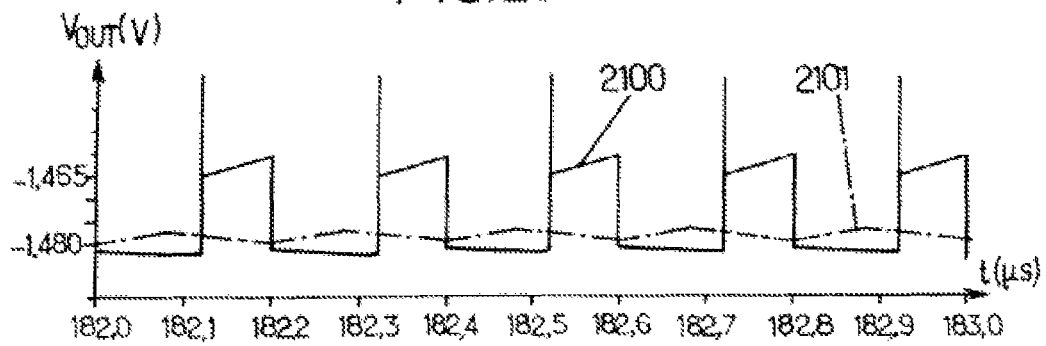
Figure 22:
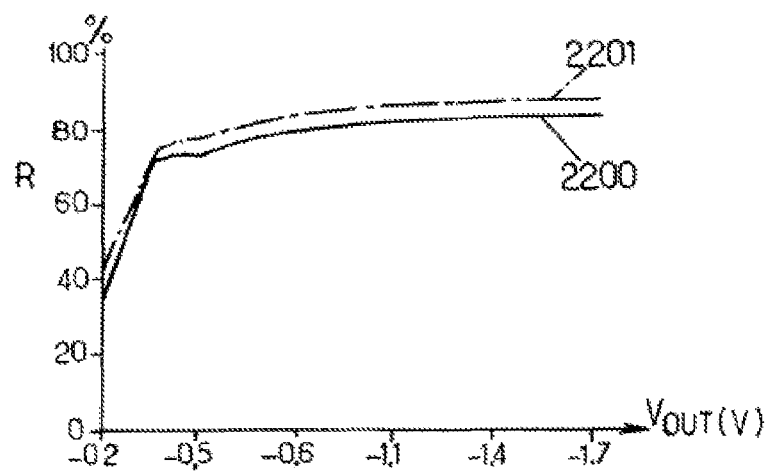

FIGS. 20 to 22 illustrate the results of a simulation comparing the performances of a circuit according to the present embodiment and an equivalent prior art buck/boost inverting circuit. The following values were used:

$C_{OUT}$=10 µF,
$C_{SU}$=10 µF,
L=1 µH,
$f=1/T_S$=5 MHz, and
$V_{BAT}$=2.7 V.

FIG. 20 represents the evolution of the absolute value of the current in the inductor in a transient state, for a prior art buck/boost inverting circuit (curve 2000), and for a circuit according to the present embodiment (curve 2001). The y axis is scaled to 5 hundredths of an amp, and the x axis to tenths of a microsecond. As one can see, the current in the inductor of the circuit according to the present embodiment is less than 40% of the current in the inductor of the prior art circuit. The circuit of the present embodiment therefore induces less Joule effect losses than the prior art circuit.

FIG. 21 represents the evolution of the output voltage in the circuit in a transient state, for a prior art buck/boost inverting circuit (curve 2100), and for a circuit according to the present embodiment (curve 2101). The y axis is scaled to 5 hundredths of a volt, and the x axis to tenths of a microsecond. As one can see, the output voltage of the prior art circuit is greatly impacted and has a large amplitude, while the output voltage from the circuit of the present embodiment is substantially constant. The voltage provided by the circuit according to the present embodiment therefore has very little noise.

FIG. 22 represents the evolution of the energy efficiency (as a %) as a function of the output voltage (in volts), for a prior art buck/boost circuit (curve 2200) and for a circuit according to the present embodiment (curve 2201), for an output current of 0.6 amps. As one can see, the efficiency of the circuit according to the present embodiment remains greater than the efficiency of the prior art circuit.

Variation

A variation of the previously described step-down circuit is now described with reference to FIG. 7.

In this circuit, a battery 701 loads the input terminal 700 that is connected to a controlled switch $S_{12}$ (for example a transistor) which connects the input terminal to a node 702 of the circuit. The node 702 is coupled to the output terminal 703 of the circuit by a controlled switch $S_{11}$. A capacitor 704 of value $C_{SU}$ is connected between the node 702 and a node 705 of the circuit.

The node 705 is connected to the output terminal by a low-pass filter composed of an inductor 706 of value L connected between the node 705 and the output terminal, and a capacitor 707 of value $C_{OUT}$ connected between the output terminal and a reference potential of the circuit 708 (for example the ground of the circuit). A controlled switch $S_{10}$ connects the node 705 to the reference potential.

In this embodiment, the circuit alternates between two phases of operation.

In a first phase F7, the switches $S_{10}$ and $S_{12}$ are controlled to be in the on state, while the switch $S_{11}$ is controlled to be in the off state. In a second phase F8, the switches $S_{10}$ and $S_{12}$ are controlled to be in the off state, while the switch $S_{11}$ is controlled to be in the on state.

The evolution of the voltage $V_{LX}$ at the node 705 is substantially identical to that of the graph in FIG. 6. D ($0 \leq D \leq 1$) is the duty cycle between phases F7 and F8, and $T_S$ is the sum of the durations of the two phases. Thus phase F7 is of duration $(1-D)T_S$ and phase F8 is of duration $DT_S$.

During phase F7, the voltage $V_{LX}$ is zero (meaning the zero potential of the ground), and during phase F8, the voltage $V_{LX}$ is equal to $V_{BOOST} = V_{OUT} - V_{BAT}$.

The output voltage is then equal to the average over $T_S$ of the voltage $V_{LX}$:

$$V_{OUT} = \overline{V_{LX}} = \frac{(1-D)T \times 0 + DT_S V_{BOOST}}{T_S},$$

and $$V_{OUT} = -\frac{D}{(1-D)} V_{BAT}.$$

Step-Up and Step-Down Circuit

A circuit is now described with reference to FIG. 8 which can selectively operate as a step-up or a step-down circuit, using the general architecture described with reference to FIG. 1.

The circuit is connected by its input terminal 800 to a battery 801.

A controlled switch $S_{13}$ (for example a transistor) is connected between the input terminal and a node 802 of the circuit. Another controlled switch $S_{14}$ is connected between the input terminal and a node 803 of the circuit. A switch $S_{15}$ is connected between the node 803 and a reference potential of the circuit (for example the ground 804 of the circuit). A capacitor 805 of value $C_{su}$ is connected between the nodes 802 and 803.

A low-pass filter composed of an inductor 807 of value L and a capacitor 808 of value $C_{OUT}$ is arranged between the node 802 and the output terminal 806 of the circuit. The inductor is connected between the node 802 and the output terminal, and the capacitor 808 is connected between the output terminal and the ground of the circuit.

The circuit is connected by its output terminal to a load resistor 809 of value $R_L$.

In a first mode of operation, the circuit alternates between two phases of operation.

In a first phase F9, the switches $S_{13}$ and $S_{14}$ are controlled to be in the on state, while the switch $S_{15}$ is controlled to be in the off state. Thus the electrical energy provided by the battery is pulled and supplied to the load 809 across the inductor 807. In a second phase F10, the switches $S_{13}$ and $S_{14}$ are controlled to be in the off state, while the switch $S_{15}$ is controlled to be in the on state. The energy stored in the capacitor 805 is therefore pulled and stored in the inductor 807.

FIG. 9 illustrates the evolution in the voltage $V_{LX}$ at the node 802 during phases F9 and F10. D ($0 \le D \le 1$) is the duty cycle between phases F9 and F10, and $T_s$ is the sum of the durations of the two phases. Thus phase F9 is of duration $(1-D) T_s$ and phase F10 is of duration $DT_s$.

During phase F9, the voltage $V_{LX}$ is zero (meaning the zero potential of the ground), and during phase F10, the voltage $V_{LX}$ is equal to $V_{BAT}$, meaning the battery voltage applied to the input terminal.

The output voltage is then equal to the average over $T_S$ of the voltage $V_{LX}$:

$$V_{OUT} = \overline{V_{LX}} = \frac{(1-D)T_S \times 0 + DT_S V_{BAT}}{T_S},$$

and $$V_{OUT} = DV_{BAT}.$$

In this mode of operation, the circuit therefore operates as a step-down circuit.

In order to operate the circuit as a step-up circuit, in a second mode of operation the states of the switches $S_{14}$ and $S_{15}$ are reversed during the phases of operation F9 and F10. We therefore have an operation equivalent to the step-up circuit described with reference to FIGS. 2 and 3.

The switches are controlled as described above for changing from one mode to another.

With a circuit according to the present embodiment, performances are obtained that are equivalent to those for step-up and step-down circuits.

Variation

A variation of the circuit described above is now described with reference to FIG. 10.

The input terminal 1 of the circuit is charged by a battery 2. The input terminal is connected to a node 3 of the circuit by a controlled switch $S_{16}$ (for example a transistor). The input terminal is also connected to another node 4 of the circuit by a controlled switch $S_{18}$. The node 4 is also connected to a reference potential of the circuit (for example the ground 6 of the circuit) by a switch $S_{16}$. A capacitor 5 of value $C_{SU}$ is connected between the two nodes 3 and 4. Also, the node 3 is connected to the reference potential of the circuit by the switch $S_{17}$. The node 3 is connected as well to the output terminal 7 of the circuit by a low-pass filter. This filter comprises an inductor 8 of value L connected between the node 3 and the output terminal 7, and a capacitor 9 of value $C_{OUT}$ connected between the output terminal and the ground. The output terminal is connected to a resistive load 10 of value $R_L$.

The circuit alternates between four phases of operation.

In an eleventh phase F11 of operation, the switches $S_{17}$ and $S_{18}$ are controlled to be in the off state while the switches $S_{16}$ and $S_{19}$ are controlled to be in the on state. In a twelfth phase of operation F12, the switches $S_{16}$, $S_{17}$, and $S_{19}$ are controlled to be in the off state while the switch $S_{18}$ is controlled to be in the on state.

The eleventh and twelfth phases are similar to those implemented in the step-up circuit described with reference to FIGS. 2 and 3.

In a thirteenth phase of operation F13, the switches $S_{17}$, $S_{18}$, and $S_{19}$ are controlled to be in the off state while the switch $S_{16}$ is controlled to be in the on state. In a fourteenth phase of operation F14, the switches $S_{16}$, $S_{18}$, and $S_{19}$ are controlled to be in the off state while the switch $S_{17}$ is controlled to be in the on state.

The last two phases are similar to those implemented in the circuit described with reference to FIGS. 5 and 6.

In this manner, the circuit operates as a step-up circuit in the eleventh and twelfth phases, and operates as a step-down circuit in the thirteenth and fourteenth phases.

To ensure that the capacitor $C_{SU}$ is charged when changing to operation as a step-up circuit and thus avoid high inrush current, there can be a precharge circuit (not represented) adapted to precharge the capacitor $C_{SU}$ during the thirteenth phase. In this case, instead of controlling the switch $S_{19}$ to be in the off state in the thirteenth phase, the switch is left in the on state and connected to the precharge circuit.

Figure 10:
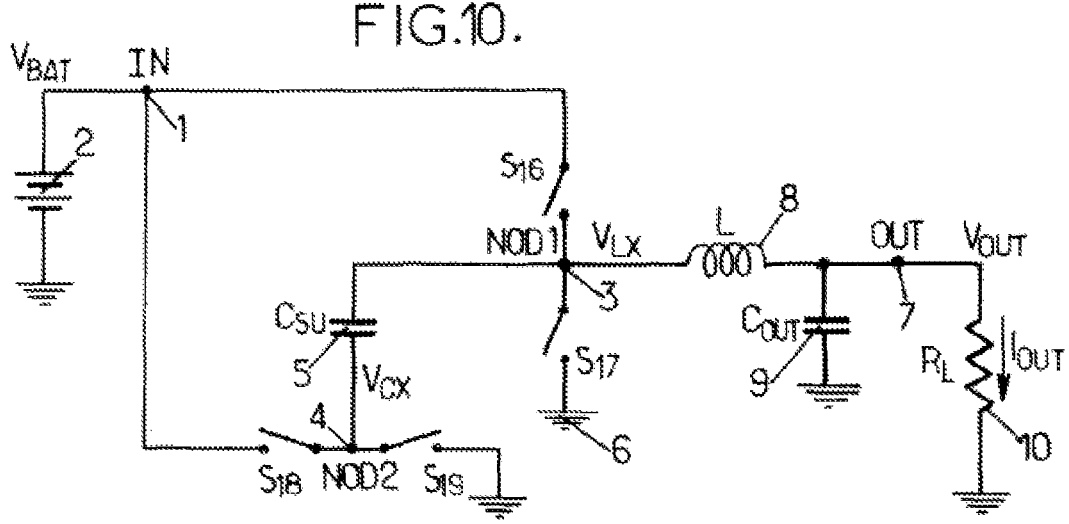
FIG. 10 illustrates one variation of the step-up circuit.
Figure 11:
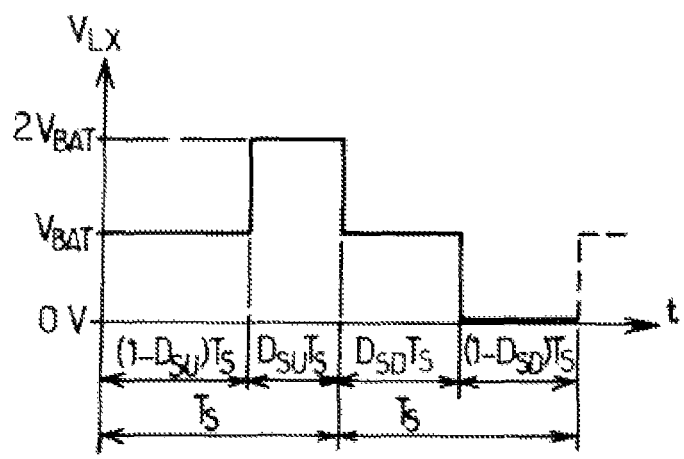
FIG. 11 illustrates the evolution of the input voltage of the low-pass filter module in the variation in FIG. 10.

FIG. 10 illustrates the evolution of the voltage $V_{LX}$ at the node 3 during phases F11 to F14. $D_{SU}$ ($0 \le D_{SU} \le 1$) is the duty cycle between the phases F11 and F12, and $T_S$ is the sum of the durations of the two phases. Thus phase F11 is of duration $(1-D_{SU})T_S$ and phase F12 is of duration $D_{SU}T_S$. $D_{SD}$ ($0 \le D_{SD} \le 1$) is the duty cycle between phases F13 and F14, and the sum of the durations of the two phases is equal to $T_S$. Thus phase F13 is of duration $(1-D_{SD})T_S$ and phase F14 is of duration $D_{SD}T_S$.

During phase F11, the voltage $V_{LX}$ is equal to $V_{BAT}$ (meaning the battery voltage applied to the input terminal). During phase F12, the voltage $V_{LX}$ is equal to $2V_{BAT}$. During phase F13, the voltage $V_{LX}$ is equal to $V_{BAT}$. During phase F14, the voltage $V_{LX}$ is equal to 0 (meaning the value of the ground potential).

The output voltage is then equal to the average over $2T_S$ of the voltage $V_{LX}$:

$$V_{OUT} = \overline{V_{LX}} = \frac{(1-D_{SU})V_{BAT}T_S + D_{SU}T_S \times 2V_{BAT} + D_{SD}T_S V_{BAT} + (1-D_{SD})T_S \times 0}{2T_S},$$

and $$V_{OUT} = (1 + D_{SU} + D_{SD})\frac{V_{BAT}}{2}.$$

By varying the values of $D_{SU}$ and $D_{SD}$, the output voltage can be adjusted.

In one embodiment of this variation, the circuit operates according to three modes of operation, which are:
- a mode SU wherein it alternates between phases F11 and F12, and operates as a step-up circuit,
- a mode of operation SD wherein it alternates between phases F13 and F14, and operates as a step-down circuit, and
- a mode of operation SU/D wherein it alternates between phases F11 to F14, and operates in a hybrid manner between a step-up and a step-down circuit depending on the adjustments to the duty cycles $D_{SU}$ and $D_{SD}$.

Figure 23:
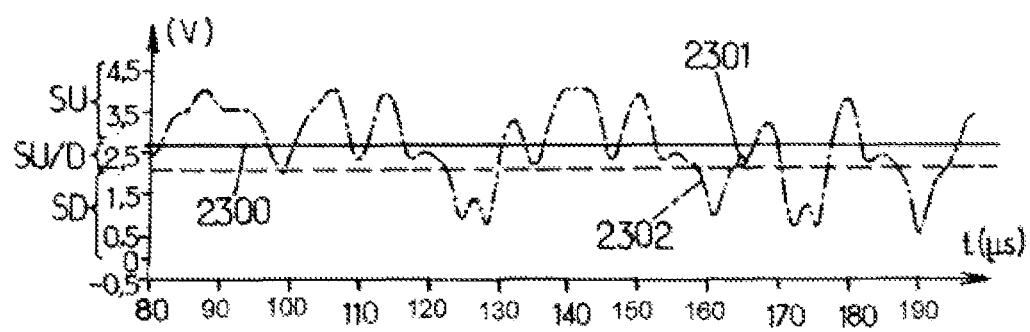
Figure 24:
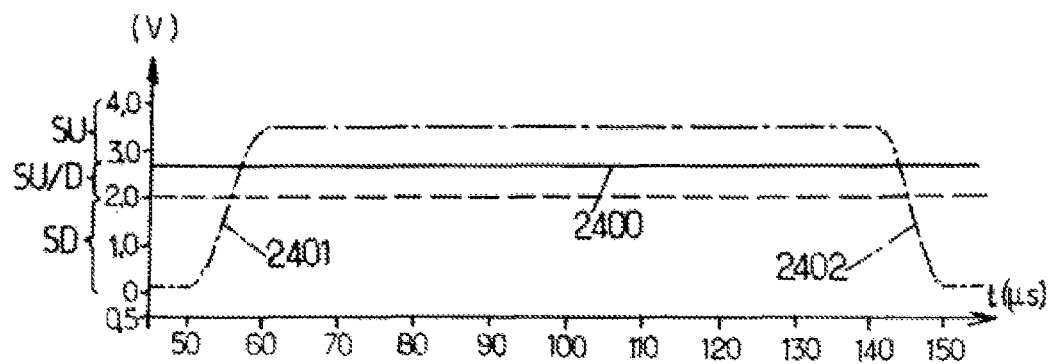

FIGS. 23 and 24 illustrate simulation results showing the performances of a circuit operating in the three modes of operation in order to respectively perform an envelope detection and a power conversion in a telecommunications circuit. The following values were used:
$C_{OUT}$=470 nF,
$C_{SU}$=4.7 µF,
L=1 µH,
f=1/$T_S$=5 MHz,
$R_L$=6 Ohms, and
$V_{BAT}$=2.7 V.

FIG. 23 represents the evolution of the battery voltage (curve 2300), the output voltage (2301), and a reference voltage (curve 2302) to be followed by the conversion circuit. The conversion circuit is controlled (via the duty cycles $D_{SU}$ and $D_{SD}$) to provide, from the input voltage, a voltage proportional to the reference voltage (a control circuit for realizing such an envelope detection is described below).

As one can see, the output voltage is almost exactly the same as the reference voltage. Depending on the level of the reference voltage relative to the battery voltage, the circuit is operated in one of three modes: SU (when the reference voltage is greater than the battery voltage (need to step up the voltage)), SD (when the reference voltage is much lower than the battery voltage (need to step down the voltage)), and SU/D (when the reference voltage is slightly less than the battery voltage).

FIG. 24 represents the evolution of the battery voltage (curve 2400), the output voltage (2401), and a reference voltage (curve 2402) to be followed by the conversion circuit. The conversion circuit is controlled (via the duty cycles $D_{SU}$ and $D_{SD}$) to provide, from the input voltage, a voltage proportional to the reference voltage, which corresponds here to a voltage for supplying power to a circuit. This voltage changes little (slopes at the start and end, and a power level plateau between the two).

Similarly to above, one can see that the output voltage is almost exactly the same as the reference voltage.

Whether the reference voltage is in continuous mode (FIG. 24) or in steady state mode (FIG. 23), the circuit provides satisfactory voltage conversion. The circuit offers a good frequency range.

In one configuration (not represented) of this embodiment, instead of having the controlled switch $S_{18}$ connected between the node 4 and the input 1, the controlled switch $S_{18}$ is connected between the node 4 and a linear voltage regulator which delivers a voltage $V_R$ that is less than and proportional to the input voltage. In this configuration, the voltage $V_{BOOST}$ is equal to $V_{BAT}+V_R$. The general operation of the circuit remains the same.

Control Circuits

A first switch control circuit is now described with reference to FIG. 12.

This circuit comprises an error amplifier 120 which receives as input a control voltage $V_{CMD}$, as well as a voltage corresponding to the transformation of the output voltage of a circuit according to one embodiment $V_{OUT}$ by a compensation network 121. The compensation network serves to offset the frequency response of the output filter composed of the association of the inductor and the capacitor as will be apparent to a person skilled in the art. The output from the error amplifier thus corresponds to an amplification of the difference between the control voltage (meaning the voltage desired as output from the controlled circuit) and the output of the controlled circuit. This output is provided to a comparator 122 which compares this output to a sawtooth voltage $V_{SAW}$. The output from the comparator 122 is a voltage PWM which has a high state if the output from the error amplifier 120 is greater than the voltage $V_{SAW}$, and a low state if not. As will be apparent to a person skilled in the art, depending on the level of the output voltage from the error amplifier 120 (and therefore on the difference between the control voltage and the output from the controlled circuit), the duty cycle between the high state and the low state can vary. The PWM voltage is then provided to a phase generation circuit 123 (non-overlapping circuit) in order to generate two control signals $\phi_1$ and $\phi_2$ in phase opposition.

The circuit described with reference to FIG. 12 can serve to control a circuit according to one of the above embodiments and their variations when they alternate between two phases, by controlling the different switches. For example, the signals provided by the circuit 123 control the transistor gates used as switches.

The circuit described with reference to FIG. 12 can serve to control a step-up circuit or a step-down circuit.

As an example, in the step-up circuit described with reference to FIG. 2, the control signal $\phi_1$ can control the switches $S_1$ and $S_2$, and the signal $\phi_2$ for the switch $S_3$. As the signals $\phi_1$ and $\phi_2$ are in phase opposition, switches $S_1$ and $S_2$ on the one hand and switch $S_3$ on the other open and close in phase opposition as described above.

As a further example, in the step-up circuit described with reference to FIG. 4, the control signal $\phi_1$ can control the switches $S_7$ and $S_9$, and the signal $\phi_2$ for the switch $S_8$. As the signals $\phi_1$ and $\phi_2$ are in phase opposition, the switches $S_7$ and $S_9$ on the one hand and switch $S_8$ on the other will open and close in phase opposition as described above.

Figure 13:
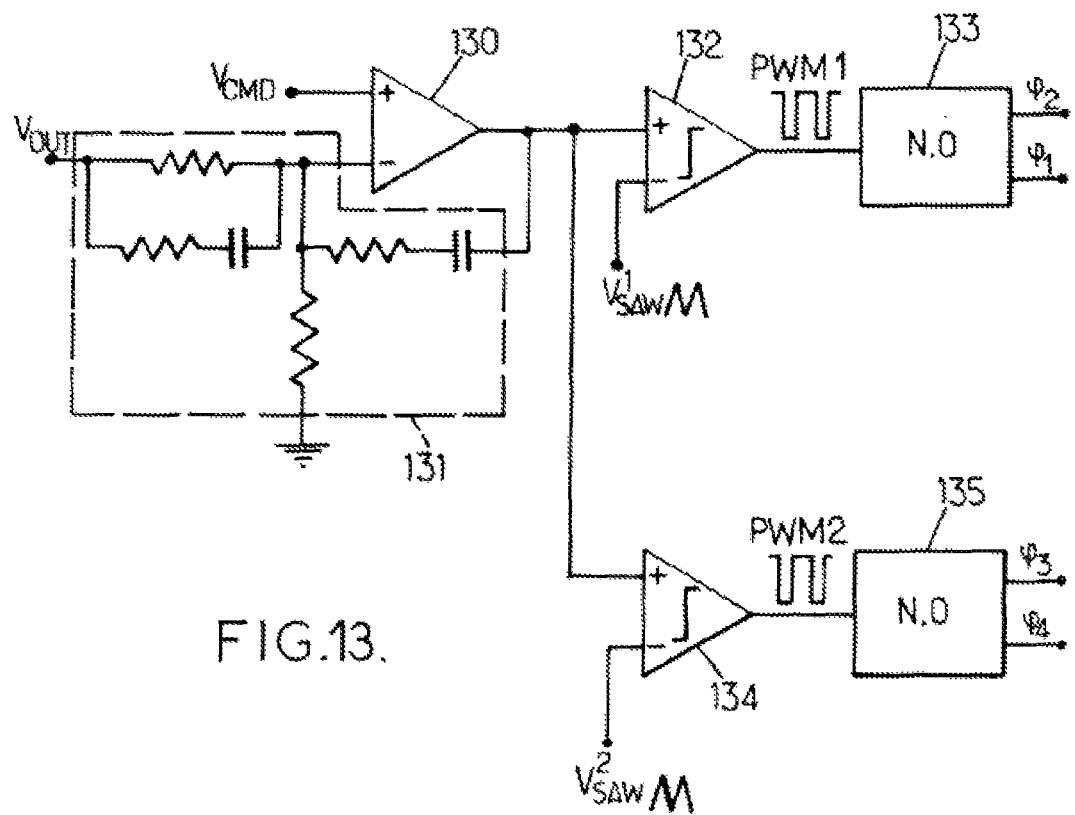

A second switch control circuit is now described with reference to FIG. 13.

Figure 12:
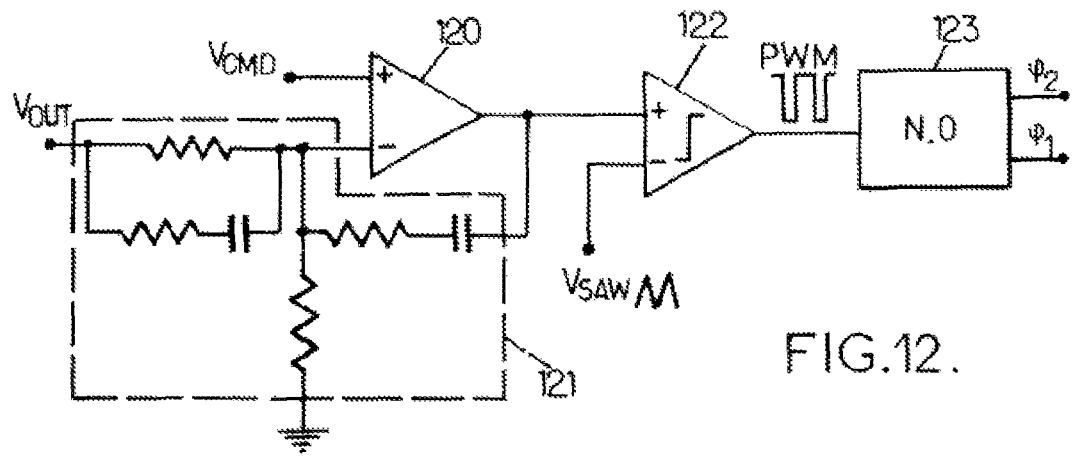
FIGS. 12 and 13 illustrate control circuits according to some embodiments.

This circuit has elements 130, 131, 132, and 133 which are respectively similar to items 120, 121, 122, and 123 of FIG. 12.

A first sawtooth voltage $V_{SAW}^1$ is provided to the comparator 132, and a second sawtooth voltage $V_{SAW}^2$ is provided to a comparator 134 which compares this voltage to the output from the comparator 130. The comparator 134 thus generates a voltage PWM2 which has a high state if the output from the comparator 130 is greater than the voltage $V_{SAW}^2$, and a low state if not. This voltage PWM2 is provided to a phase generation circuit 135 (non-overlapping circuit) in order to generate two control signals in phase opposition.

The voltages $V_{SAW}^1$ and $V_{SAW}^2$ are offset and have different average values and the same phase and same amplitude in order to allow generating different phases as output from the circuits 133 and 135.

Four control signals $\phi_1$, $\phi_2$, $\phi_3$, and $\phi_4$ are obtained in this manner. Signals $\phi_1$ and $\phi_2$ in phase opposition are obtained having a given duty cycle over a half-period, and signals $\phi_3$ and $\phi_4$ in phase opposition having another duty cycle over the same half-period.

The circuit described with reference to FIG. 13 can be used to control the switches of a circuit according to the third embodiment.

As an example, in the embodiment described with reference to FIG. 8, one can obtain the same duty cycle for signals PWM1 and PWM2, and in the first mode of operation one can control the switches $S_{13}$ and $S_{14}$ with the signal $\phi_1$ and control the switch $S_{15}$ with the signal $\phi_2$, then in the second mode of operation can control the switches $S_{13}$ and $S_{15}$ with the signal $\phi_3$ and control the switch $S_{14}$ with the signal $\phi_4$.

As a further example, in the variation described with reference to FIG. 10, one can, for a duration $T_S$ (corresponding to phases F11 and F12), control the switches $S_{16}$ and $S_{19}$ with the signal $\phi_1$ and control the switch $S_{18}$ with the signal $\phi_2$, then for a next duration $T_S$ (corresponding to phases F13 and F14) can control the switch $S_{16}$ with the signal $\phi_3$ and control the switch $S_{17}$ with the signal $\phi_4$. For this purpose, the circuits 133 and 135 are alternately connected to the controlled circuit, and when a switch is not connected to a control signal, it remains in the off state.

This invention has been described and illustrated in the detailed description and figures provided. The invention is not limited to the embodiments presented. Other variations, embodiments, and combinations of the described embodiments can be deduced and implemented by a person skilled in the art from reading the present description and the attached figures.

In the claims, the term "comprise" does not exclude other elements or other steps. The indefinite article "a" does not exclude the plural. The different characteristics presented and/or claimed can be advantageously combined. Their presence in the description or in different dependent claims does not exclude this possibility. The reference labels are not to be taken as limiting the scope of the invention.

The invention claimed is:

1. A direct current voltage conversion circuit, comprising:
an input terminal for receiving a direct current input voltage to be converted;
an output terminal for delivering an output voltage resulting from the conversion of the input voltage;
a low-pass filter module with one output connected to the output terminal and one input connected to a first node of the direct current voltage conversion circuit; and
a capacitor module connected between the first node and a second node of the direct current voltage conversion circuit;
wherein:
the first node is connected to a first switching module configured to switch between applying and not applying potentials to the first node as a function of phases of operation of the direct current voltage conversion circuit;
the second node is connected to a second switching module configured to switch between applying and not applying potentials to the second node as a function of phases of operation of the direct current voltage conversion circuit; and
the output voltage varies as a function of a duty cycle between durations of the phases of operation of the direct current voltage conversion circuit and the input voltage; and
the direct current voltage conversion circuit is operative to transition between any of the following operational configurations, each comprising alternating between two or more phases of operation,
a step-up configuration in which the voltage at the output terminal is equal to or greater than the voltage at the input terminal,
an inverting step-down configuration in which the voltage at the output terminal is of opposite polarity and equal to or less than the voltage at the input terminal, and
a step-up/down configuration in which the voltage at the output terminal varies between values greater than and less than the voltage at the input terminal.

2. The circuit of claim 1, wherein the direct current voltage conversion circuit operates in the step-up configuration and alternates between two phases of operation:
a first phase of operation wherein the first switching module applies to the first node a potential of the input terminal, and the second switching module applies to the second node a reference potential of the direct current voltage conversion circuit; and
a second phase of operation wherein the first switching module does not apply potential to the first node, and the second switching module applies to the second node a potential proportional to the potential of the input terminal.

3. The direct current voltage conversion circuit of claim 2, wherein:
the first switching module comprises a first controlled switch connected between the first node and the input terminal;
the second switching module comprises a second controlled switch connected between the second node and the reference potential, and a third controlled switch connected between the second node and the input terminal; and
the first and second controlled switches are controlled to be in the ON state while the third controlled switch is controlled to be in the OFF state in the first phase, and the first and second controlled switches are controlled to be in the OFF state while the third controlled switch is controlled to be in the ON state in the second phase.

4. The direct current voltage conversion circuit of claim 1, wherein the direct current voltage conversion circuit operates in the step-up configuration and alternates between two phases of operation:
a first phase of operation wherein the first switching module applies to the first node a potential of the input terminal, and the second switching module applies to the second node a reference potential of the direct current voltage conversion circuit; and
a second phase of operation wherein the first switching module does not apply potential to the first node, and the second switching module applies to the second node a potential of the output terminal.

5. The direct current voltage conversion circuit of claim 4, wherein:
the first switching module comprises a first controlled switch connected between the first node and the input terminal; and
the second switching module comprises a second controlled switch connected between the second node and the reference potential, and a third controlled switch connected between the second node and the output terminal;
wherein the first and second controlled switches are controlled to be in the ON state while the third controlled switch is controlled to be in the OFF state in the first phase, and the first and second controlled switches are controlled to be in the OFF state while the third controlled switch is controlled to be in the ON state in the second phase.

6. The direct current voltage conversion circuit of claim 1, wherein said direct current voltage conversion circuit operates in the inverting step-down configuration and alternates between two phases of operation:
a first phase of operation wherein the first switching module applies to the first node a reference potential of the direct current voltage conversion circuit, and the second switching module applies to the second node a potential of the input terminal; and
a second phase of operation wherein the first switching module does not apply potential to the first node, and the second switching module applies to the second node the reference potential of the direct current voltage conversion circuit.

7. The direct current voltage conversion circuit of claim 6, wherein:
the first switching module comprises a first controlled switch connected between the first node and the reference potential; and
the second switching module comprises a second controlled switch connected between the second node and the reference potential, and a third controlled switch connected between the second node and the input terminal;
wherein the first and third controlled switches are controlled to be in the ON state while the second controlled switch is controlled to be in the OFF state in the first phase, and the first and third controlled switches are controlled to be in the OFF state while the second controlled switch is controlled to be in the ON state in the second phase.

8. The direct current voltage conversion circuit of claim 1, wherein said direct current voltage conversion circuit operates in the inverting step-down configuration and alternates between two phases of operation:
a first phase of operation wherein the first switching module applies to the first node a reference potential of the direct current voltage conversion circuit, and the second switching module applies to the second node a potential of the input terminal; and
a second phase of operation wherein the first switching module does not apply potential to the first node, and the second switching module applies to the second node a potential of the output terminal.

9. The direct current voltage conversion circuit of claim 8, wherein:

the first switching module comprises a first controlled switch connected between the first node and the reference potential; and
the second switching module comprises a second controlled switch connected between the second node and the output terminal, and a third controlled switch connected between the second node and the input terminal;
wherein the first and third controlled switches are controlled to be in the ON state in the first phase while the second controlled switch is controlled to be in the OFF state, and the first and third controlled switches are controlled to be in the OFF state in the second phase while the second controlled switch is controlled to be in the ON state.

10. The direct current voltage conversion circuit of claim 1, wherein said direct current voltage conversion circuit operates in the step-up/down configuration in which the direct current voltage conversion circuit is controlled to selectively operate according to two modes of operation:
a step-down mode of operation wherein the direct current voltage conversion circuit alternates between two phases of operation:
a first phase of operation wherein the first switching module applies to the first node a potential of the input terminal, and the second switching module applies to the second node the potential of the input terminal; and
a second phase of operation wherein the first switching module does not apply potential to the first node, and the second switching module applies to the second node a reference potential of the direct current voltage conversion circuit; and
a step-up mode of operation wherein the direct current voltage conversion circuit alternates between the following two phases of operation:
a third phase of operation wherein the first switching module applies to the first node the potential of the input terminal, and the second switching module applies to the second node the reference potential of the direct current voltage conversion circuit; and
a fourth phase of operation wherein the first switching module does not apply potential to the first node, and the second switching module applies to the second node a potential proportional to the potential of the input terminal.

11. The direct current voltage conversion circuit of claim 10, wherein:
the first switching module comprises a first controlled switch connected between the first node and the input terminal; and
the second switching module comprises a second controlled switch connected between the second node and the input terminal, and a third controlled switch connected between the second node and the reference potential;
wherein:
in the step-down mode of operation, the first and second controlled switches are controlled to be in the ON state while the third controlled switch is controlled to be in the OFF state in the first phase, and the first and second controlled switches are controlled to be in the OFF state while the third controlled switch is controlled to be in the ON state in the second phase; and
in the step-up mode of operation, the first and third controlled switches are controlled to be in the ON state while the second controlled switch is controlled to be in the OFF state in the third phase, and the first and third controlled switches are controlled to be in the OFF state while the second controlled switch is controlled to be in the ON state in the fourth phase.

12. The direct current voltage conversion circuit of claim 1, wherein said direct current voltage conversion circuit operates in the step-up/down configuration in which the direct current voltage conversion circuit is controlled to successively alternate between four phases of operation:
   a first phase of operation wherein the first switching module applies to the first node a potential of the input terminal, and the second switching module applies to the second node a reference potential of the direct current voltage conversion circuit;
   a second phase of operation wherein the first switching module does not apply potential to the first node, and the second switching module applies to the second node a potential proportional to the potential of the input terminal;
   a third phase of operation wherein the first switching module applies to the first node the potential of the input terminal, and the second switching module does not apply potential to the second node; and
   a fourth phase of operation wherein the first switching module applies to the first node the reference potential of the direct current voltage conversion circuit, and the second switching module does not apply potential to the second node.

13. The circuit of claim 12, wherein:
   the first switching module comprises a first controlled switch connected between the first node and the input terminal, and a second controlled switch connected between the first node and the reference potential of the direct current voltage conversion circuit; and
   the second switching module comprises a third controlled switch connected between the second node and the input terminal, and a fourth controlled switch connected between the second node and the reference potential;
   wherein:
      in the first phase, the second and third controlled switches are controlled to be in the OFF state while the first and fourth controlled switches are controlled to be in the ON state,
      in the second phase, the first, second and fourth controlled switches are controlled to be in the OFF state while the third controlled switch is controlled to be in the ON state;
      in the third phase, the second, third and fourth controlled switches are controlled to be in the OFF state while the first controlled switch is controlled to be in the ON state; and
      in the fourth phase, the first, third and fourth controlled switches are controlled to be in the OFF state while the second controlled switch is controlled to be in the ON state.

14. The direct current voltage conversion circuit of claim 1, said direct current voltage conversion circuit selectively operating according to at least two of three operational configurations:
   a step-up configuration wherein the direct current voltage conversion circuit alternates between two phases of operation:
      a first phase of operation wherein the first switching module applies to the first node a potential of the input terminal, and the second switching module applies to the second node a reference potential of the direct current voltage conversion circuit; and
      a second phase of operation wherein the first switching module does not apply potential to the first node, and the second switching module applies to the second node a potential proportional to the potential of the input terminal;
   an inverting step-down configuration wherein the direct current voltage conversion circuit alternates between two phases of operation:
      a third phase of operation wherein the first switching module applies to the first node the reference potential of the circuit, and the second switching module applies to the second node the potential of the input terminal; and
      a fourth phase of operation wherein the first switching module does not apply potential to the first node, and the second switching module applies to the second node the reference potential of the direct current voltage conversion circuit; and
   a step-up/down configuration wherein the direct current voltage conversion circuit alternates between the following four phases of operation:
      a fifth phase of operation wherein the first switching module applies to the first node the potential of the input terminal, and the second switching module applies to the second node a reference potential of the direct current voltage conversion circuit;
      a sixth phase of operation wherein the first switching module does not apply potential to the first node, and the second switching module applies to the second node the potential proportional to the potential of the input terminal;
      a seventh phase of operation wherein the first switching module applies to the first node the potential of the input terminal, and the second switching module does not apply potential to the second node; and
      an eighth phase of operation wherein the first switching module applies to the first node the reference potential of the direct current voltage conversion circuit, and the second switching module does not apply potential to the second node.

15. The direct current voltage conversion circuit of claim 1, wherein the first switching module comprises a first controlled switch connected between the first node and the input terminal, and a second controlled switch connected between the first node and the reference potential of the direct current voltage conversion circuit; and
   the second switching module comprises a third controlled switch connected between the second node and the input terminal, and a fourth controlled switch connected between the second node and the reference potential;
   said direct current voltage conversion circuit operating selectively according to one of three operational configurations:
      a step-up configuration wherein the first and fourth controlled switches are controlled to be in the ON state, while the second and third controlled switches are controlled to be in the OFF state in a first phase of operation, and wherein the first, second and fourth controlled switches are controlled to be in the OFF state while the third controlled switch is controlled to be in the ON state in a second phase of operation, with the direct current voltage conversion circuit alternating between the first and second phases;
      an inverting step-down configuration wherein the second, third and fourth controlled switches are controlled to be in the OFF state while the first controlled switch is controlled to be in the ON state in a third phase of operation, and wherein the first, third and fourth controlled switches are controlled to be in the OFF state while the second controlled switch is controlled to be in the ON state in a fourth phase of operation, with the direct current voltage conversion circuit alternating between the third and fourth phases; and a step-up/down configuration, wherein the direct current voltage conversion circuit alternates between the first, second, third and fourth phases of operation.

16. The direct current voltage conversion circuit of claim 2, wherein the reference potential of the direct current voltage conversion circuit is a ground potential.

17. The direct current voltage conversion circuit of claim 2, wherein the potential proportional to the potential of the input terminal is the potential of the input terminal.

18. The direct current voltage conversion circuit of claim 2, wherein the potential proportional to the potential of the input terminal is a potential proportional to and less than the potential of the input terminal.

19. The direct current voltage conversion circuit of claim 17, wherein the potential proportional to the potential of the input terminal is generated by a linear regulator.

* * * * *